Apr. 24, 1923.
J. D. RICHARDS
1,452,984
SELF CLEANING RAKE
Original Filed July 30, 1921
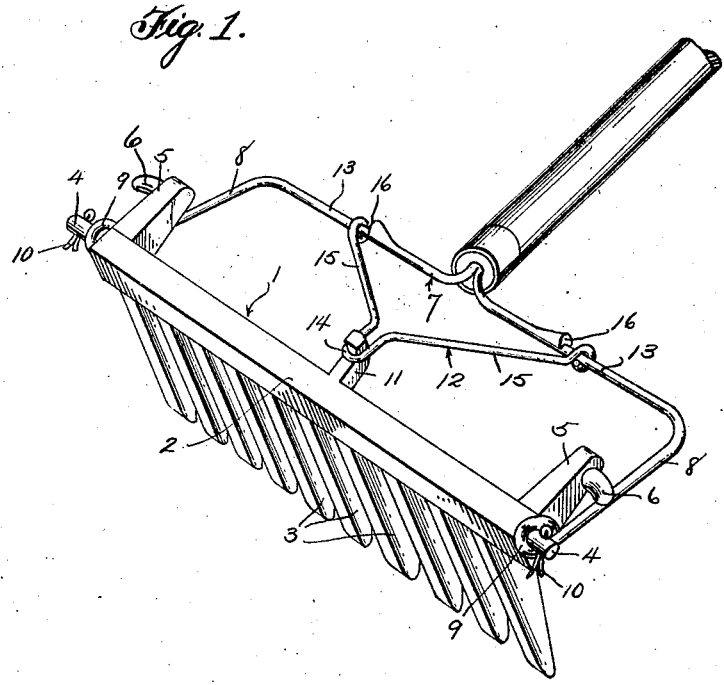
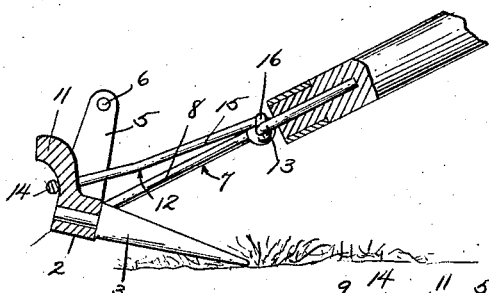
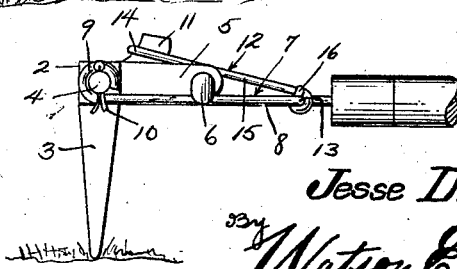
Inventor
Jesse D. Richards
By Watson E. Coleman
Attorney Patented Apr. 24, 1923.

1,452,984

UNITED STATES PATENT OFFICE.

JESSE D. RICHARDS, OF LA FONTAINE, INDIANA, ASSIGNOR OF ONE-THIRD TO JESSE D. GILLENWATER, OF WABASH, INDIANA, AND ONE-THIRD TO CHARLEY GABLE, OF PERU, INDIANA.

SELF-CLEANING RAKE.

Application filed July 30, 1921, Serial No. 488,594. Renewed September 25, 1922. Serial No. 590,539.

*To all whom it may concern:*

Be it known that I, JESSE D. RICHARDS, a citizen of the United States, residing at La Fontaine, in the county of Wabash and State of Indiana, have invented certain new and useful Improvements in Self-Cleaning Rakes, of which the following is a specification, reference being had to the accompanying drawings.

The present invention has for its purpose to provide a device of this kind wherein the rake head is mounted rotatably in its frame, with limiting means to hold the rake head in an operative position, in combination with spring means, against the tension of which the rake head may be tilted in its frame, for the purpose of cleaning the grass or the like from the teeth, by dragging the rake teeth over the surface being raked.

Another purpose is the provision of a device of this general character, wherein the rake embodies a wire frame, in the arms of which the pintles of the rake head are rotatably mounted, in combination with spring means operatively connecting the head and the frame, in order to hold it in position against movement in one direction, in combination with abutment lugs on the arms of the head and adapted to engage the ends of the frame, to hold the head against movement in the opposite direction.

Still another purpose is to provide a rake, wherein the rake head maintains its proper position when pulling the rake toward the operator, and when the rake is moved or pushed from the operator, the rake head will tilt, so that the teeth will slide upon the surface of the ground due to pressure being applied upon the handle of the rake frame, so as to clean the teeth of the rake head. The spring means connecting the rake head and the frame act to return the rake head to its normal position when pressure is relieved upon the handle.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective of the improved rake constructed in accordance with the invention;

Figure 2 is a sectional view through the same showing the rake head tilted with the teeth extending rearwardly, so that the teeth may be cleaned by passing forwardly over the surface;

Figure 3 is a detail sectional view through one of the arms 5 showing the lugs 6 in engagement with one of the arms 8; and Figure 4 is a view in end elevation showing the rake head in an operative position.

Referring to the drawings, 1 designates the rake head, which comprises a bar 2 and teeth 3. The opposite ends of the bar are provided with pintles or lugs 4, which are axially aligned. Extending laterally from the ends of the bar 2 are arms 5 provided with lugs or projections 6. A U-shaped wire rake frame 7 is provided, and forming a part of this frame are arms 8 having bearing eyes 9, for the reception of the pintles 4 of the rake bar. Cotter pins 10 pass through the pintles, to retain the pintles operatively mounted in said bearing eyes. The arms of the U-shaped frame are disposed substantially parallel with the arms 5, so that the lugs 6 may overlie the arms of the frame, hence holding the rake head in an operative position. Projecting from the central portion of the bar 2 of the rake head is a curved hook 11, which extends upwardly and rearwardly. A portion of the upwardly extending part of the hook is substantially parallel with one of the faces of the bar 2 of the rake head. A spring yoke 12 connects the protuberance and the parts 13 of the frame. This spring consists of a piece of wire bent upon itself to form an elongated loop 14, which engages over the hook. The arms 15 of the spring diverge rearwardly and laterally and terminate in eyes, through which the parts 13 of the rake frame engage. The parts 13 of the rake frame are provided with abutments 16.

In using the rake, the rake is pulled toward the operator, pulling the grass therewith, and when the rake is pushed away from the operator, pressure is applied upon the rake handle, causing the teeth of the rake head to bear upon the ground, resulting in the rake head tilting against the action of said spring 12, the arms of the spring yoke sliding along the bight portion of the U-shaped frame until they are engaged against the abutments 16. Owing to the arms of the spring being placed under tension when the rake is pushed forward, the spring acts to return the rake to its normal position when pressure upon the head is relieved. The abutment lugs on the parts 13 of the rake frame act to limit the arms of the spring in their movements during the operating movements of the rake over the surface being raked. It might be said that this type of rake forms an excellent tool in working a garden, or for working the soil preparatory to planting.

The invention having been set forth, what is claimed as being new and useful is:

1. A rake of the character described comprising a U-shaped frame provided with a handle, a rake head pivoted between the arms of said frame and provided with teeth, rearwardly extending arms at the end portions of the rake head provided with lateral lugs engaging against the arms of the frame for limiting swinging movement of the rake head in one direction, and means carried by the frame and cooperating with the head for locking the head against movement in the other direction, said means comprising a rearwardly extending upturned hook carried by the head, and a retaining yoke pivoted upon the bight portion of the frame and formed with a loop engaging over said hook.

2. A rake comprising a U-shaped frame provided with a handle, a rake head pivoted between the terminals of the arms of the frame, rearwardly extending arms at the ends of the head provided with outwardly extending lugs engaging the arms of the frame for limiting movement of the head in one direction, a hook extending rearwardly from said head at the center thereof, a spring yoke including a loop portion engaged upon said hook and further including divergent arms having their terminals coiled to define eyes slidable along the bight portion of the rake frame, said frame being provided with abutments engageable by said eyes for limiting movement thereof.

In testimony whereof I hereunto affix my signature.

JESSE D. RICHARDS.